United States Patent [19]
Harris et al.

[11] Patent Number: 5,613,903
[45] Date of Patent: Mar. 25, 1997

[54] SHRIMP DEVEINING APPARATUS

[75] Inventors: James Harris, 3312 Livonia Ave., Los Angeles, Calif. 91361; Roy Fujitaki, Pasadena, Calif.

[73] Assignee: James Harris, Los Angeles, Calif.

[21] Appl. No.: 533,949

[22] Filed: Sep. 26, 1995

[51] Int. Cl.⁶ .................................................. A22C 29/02
[52] U.S. Cl. ......................................... 452/3; 452/5
[58] Field of Search ........................... 452/3, 2, 5

[56] References Cited

U.S. PATENT DOCUMENTS

| | | | |
|---|---|---|---|
| 2,263,696 | 11/1941 | Grayson | 17/2 |
| 2,263,697 | 11/1941 | Grayson | 17/2 |
| 2,391,739 | 12/1945 | Ragupos | 17/9 |
| 2,637,064 | 5/1953 | Miller | 17/2 |
| 2,702,921 | 3/1955 | Pinney | 17/2 |
| 2,760,225 | 8/1956 | Miller | 17/2 |
| 2,971,215 | 2/1961 | Sloan | 17/2 |
| 3,430,288 | 3/1969 | Lapeyre | 17/2 |
| 3,466,699 | 9/1969 | Willis et al. | 17/2 |
| 3,787,928 | 1/1974 | Domecki | 17/71 |
| 4,008,508 | 2/1977 | LaPine et al. | 17/52 |
| 4,087,887 | 5/1978 | Hoffman et al. | 17/73 |
| 4,348,788 | 9/1982 | Jurcak | 29/4 |
| 4,439,893 | 4/1984 | Betts | 17/72 |
| 4,472,858 | 9/1984 | Keith | 17/72 |
| 4,796,333 | 1/1989 | Stinson, Jr. | 17/76 |
| 4,870,719 | 10/1989 | Harris | 17/74 |
| 4,996,744 | 3/1991 | Meyer | 452/3 |
| 5,035,669 | 7/1991 | Betts | 452/5 |
| 5,035,670 | 7/1991 | Pershinske | 452/5 |
| 5,290,199 | 3/1994 | Morris | 452/3 |

*Primary Examiner*—Willis Little
*Attorney, Agent, or Firm*—D'Alessandro & Ritchie

[57] ABSTRACT

A powered shrimp deveining assembly includes a motor coupled to an output and a secondary shaft both housed in a removable enclosure, the output shaft and the secondary shaft extending through an adapter to turn a cutter against the rotation of a pair of guide disks. The adapter is provided with a boss in which one end of a bell crank is engaged, the other end of the bell crank extends in a threaded projection through an arcuate slot formed in a cover that is mounted on the adapter to shield the cutting mechanism. An idler roller on the bell crank is thus pivotally spaced from the guide disks to direct shrimp bodies against the cutter, the same bell crank fixing mechanism also retaining the cover in place.

30 Claims, 6 Drawing Sheets

SHRIMP DEVEINING APPARATUS

BACKGROUND OF THE INVENTION

1. Field of the Invention

The present invention relates to apparatus for deveining shrimp. More particularly, it relates to improvements in the cutter feed structure for removing the shrimp sand vein. The present invention may also be used to longitudinally cut such items as hot dogs and peppers.

2. The Prior Art

The process of preparing shrimp for table consumption entails the removal of the shrimp shell and, concurrently, the removal of the shrimp sand vein along with any debris contained therein. As shrimp farming has advanced, the numerical volume of shrimp passed through the deveining process has increased and automation is thus a necessary adjunct for commercial success. In the past, various powered devices were developed for assisting those engaged in commercial shrimp processing, as exemplified in the teachings of U.S. Pat. No. 2,702,921 to Pinney (the '921 patent) and U.S. Pat. No. 5,290,199 to Morris (the '199 patent). While suitable for their intended purposes, these and other prior art devices entail electrically powered drives that are proximate to the wet environment of the shrimp harvest process. This proximity has given rise to concerns over operator safety, particularly as the adjustment process used to accommodate varying sizes of shrimp harvested requires manual intervention close to electrically powered components.

Generally, the process of deveining a shrimp includes making a cut lengthwise through the shell, a cut that by necessity requires alignment. For these reasons both of the foregoing prior art teachings include spaced-apart guide wheels between which the shrimp is fed towards a rotary cutter. The deveining process therefore also effects the separation of the shell, and migration of the shell and vein matter into the drive enclosure has been a source of some concern in the past. To accommodate this concern, the '199 patent, for example, seals the through wall journals, with the mechanism for adjustment of the shrimp size being located in the motor cavity away from the cutter assembly. While fit for its intended purposes, this often-used adjustment feature positions the operator next to electrically powered components such as the motor and the protective case must be opened to effect an adjustment. A structure that provides electrical insulation and isolation of the electric components in normal use is therefore desired and it is such a structure that is disclosed herein.

OBJECTS AND ADVANTAGES OF THE INVENTION

Accordingly, it is an object of the present invention to provide a shrimp deveining apparatus in which the adjustable components are separated from the powered drive mechanism and electrically powered components.

It is a further object of the present invention to provide a shrimp processing apparatus which permits convenient and safe manual adjustment.

Yet a further object of the present invention is to provide an adjustable deveining assembly in which the adjustment mechanism also serves to fix the components of the deveining assembly together.

2

These and many other objects and advantages of the present invention will become apparent to those of ordinary skill in the art from a consideration of the drawings and ensuing description of the invention.

SUMMARY OF THE INVENTION

The present invention provides a shrimp deveining apparatus having an insulated motor enclosure containing an electrically powered drive motor provided with a rotary shaft extending from both ends thereof. A first shaft end extends through a sealed journal in the end wall of the enclosure to engage a rotary cutter on the other side thereof. A second shaft end drives a pulley assembly turning a parallel feeder shaft also journaled through the same end wall. In this form two rotary shafts are presented across the end wall, both in sealed journals to prevent water and other contaminant migration into the motor enclosure.

The feeder shaft, moreover, is fixed to two frustoconical coaxial disks, the inner disk providing a set of splines at its hub engageable by selected ones of various depth keyways on the hub of the other disk. Thus a selection of the particular keyway selects the disk separation, accommodating the typical shrimp size of the processed shrimp harvest. This disk separation straddles the rotary cutter that then strips out the sand vein and its contents.

To align each shrimp body within the disk separation, an adjustable idler roller is mounted on a bell crank pivoted from the end wall and selectively secured by a clamp nut to a removable cover enclosing the cutter, the disk assembly and the idler roller. This cover may be conformed to engage mating projections on the end wall exterior and may include the feed and discharge openings for the deveining process. One will note that the same clamping nut that is useful in adjusting the idler also completes the cover engagement, thus effecting conservation of components and convenient disassembly for adjustment and cleaning. At the same time, the pulley gearing access is at the opposite end of the structure (by removing the top cover), separating those operations normal in the deveining process from operations during which electrical shock may pose some realistic risks (e.g., exposure of the electrically powered drive motor).

According to another aspect of the invention, food items such as hot dogs and jalapeno peppers may be sliced longitudinally by the same apparatus described above.

According to yet another aspect of the invention, a source of rotary drive power, as from a mixer or a food processor or similar motorized kitchen utensil, may be coupled to the shrimp deveining apparatus so that it no longer requires an on-board electrical motor to power it. Power may be coupled by a flexible shaft coupling or by rigid shaft couplings as well known to those of ordinary skill in the art.

3

DESCRIPTION OF THE PREFERRED EMBODIMENTS

Those of ordinary skill in the art will realize that the following description of the present invention is illustrative only and is not intended to be in any way limiting. Other embodiments of the invention will readily suggest themselves to such skilled persons from an examination of the within disclosure.

Figure 1:
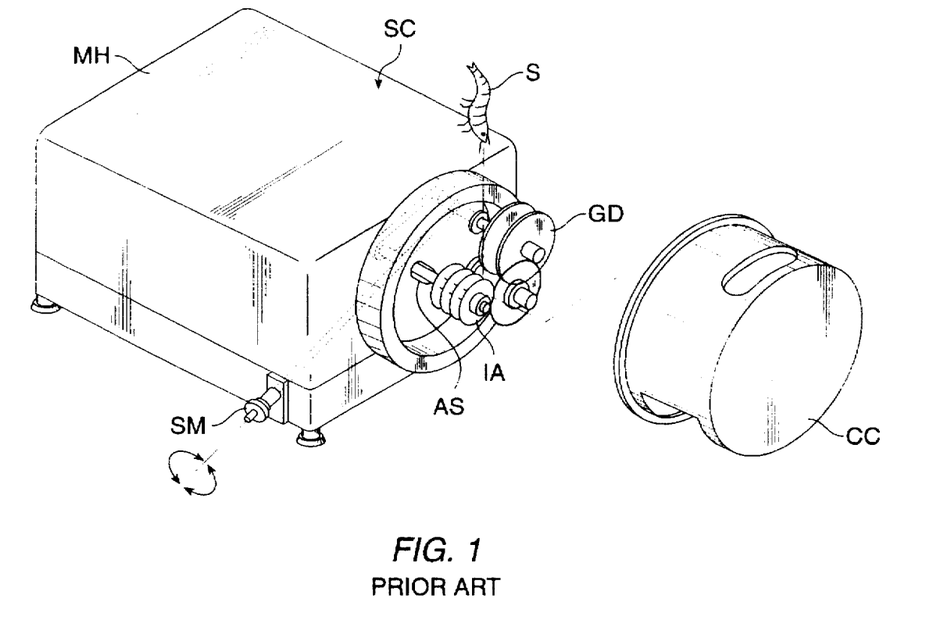
FIG. 1 is a perspective illustration of a first prior art example, illustrating the operative parts thereof.
Figure 2:
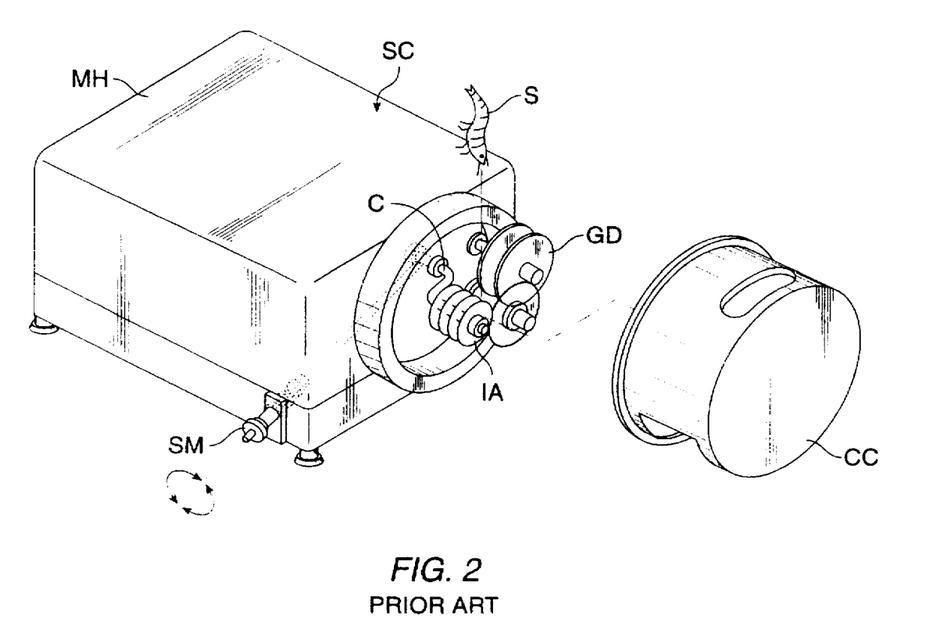
FIG. 2 is a perspective illustration of a second prior art example, illustrating the operative parts thereof.

As shown in FIG. 1, the teachings of the '921 patent to Pinney illustrate a shrimp cutting mechanism, generally at SC, in which a shrimp S is fed between two rotating guide disks GD to pass adjacent a set of cutters CT which both strip the sand vein of shrimp S and open its exoskeletal shell. An adjustable idler assembly IA retains the shrimp body between the guide disks GD, and it is the adjustment of this idler that positions the shrimp S for the cut. The varying sizes of the shrimp harvest dictate a fairly large range in this adjustment, and therefore result in a substantial adjustment slot AS through which the fluids and debris of the deveining process can migrate into the workings of the rotary power source. This loss of integrity has been solved in the '199 patent to Morris, as illustrated in FIG. 2. Equally functioning parts being identified by like part identification letters, the Morris structure of FIG. 2 journals the crank C on which the idler assembly IA is mounted and then the crank pivot alignment is fixed by a screw mechanism SM in the motor housing MH. This eliminates the need for a large adjustment slot AS as in FIG. 1. In both of these prior art examples, the cutting mechanism is shielded by a cylindrical cover CC which is retained in place by a mating fit, but is otherwise removable.

Figure 3:
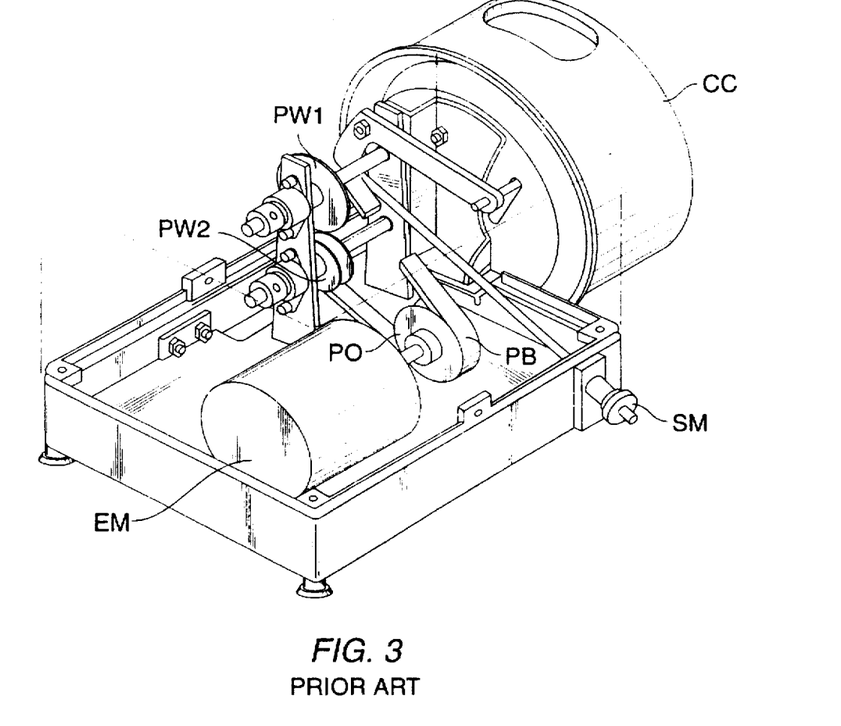
FIG. 3 is a perspective illustration, in exposed rear view, of the prior art drive arrangement effected in the devices shown in FIGS. 1 and 3.

As shown in FIG. 3, both of the foregoing prior art structures are powered in rotation by an electrical motor EM displaced laterally to rotate a pulley output PO which then drives (with a pulley belt PB) the drive pulley wheels PW1 and PW2 on the shafts that drive the guide disks GD and the cutter CT, respectively. Thus, any adjustment in the pulley ratios is rendered cumbersome, entailing the removal of the motor EM and parts manipulation adjacent the wall W through which the shafts extend.

It is the improvement over the foregoing prior art teachings that is set out herein, with particular reference being had to FIGS. 3–8. More precisely, apparatus of the presently preferred embodiment of the present invention obtains a combined advantage by wholly avoiding the through wall journal for the idler, in an idler adjustment arrangement that also fixes the cover in place. Since removal of the cover often coincides with subsequent new adjustment settings, both in the guide disk separation and idler proximity, this particular arrangement obtains large improvements in operator convenience, safety and ease of cleaning.

As shown in FIGS. 3–8, inclusive, the inventive structure, generally designated by the numeral 10, comprises a rectangular motor housing 11, defined by a base structure 11a conformed for mating with a rectangular cover shell 13, in which a support cage 12 is fixed, defined by a front panel 16 and a rear panel 17. Panels 16 and 17 are each provided with vertically spaced bearing journal pairs 21 and 22, and 31 and 32, respectively. Journals 21 and 31 receive for rotation the center shaft 35 of an electrical motor 30 mounted in cage 12 while another parallel shaft 45 is mounted in journals 22 and 32. Shafts 35 and 45 are engaged to corresponding pulleys 36 and 46 on the rear exterior of the panel 17, tied for common rotation by an elastic pulley belt 47. The other ends of shafts 35 and 45 pass through sealed journals 21a and 22a in an end wall 50 of housing base structure 11a. Thus any modification of the pulley ratio, or the periodic maintenance thereof, is easily effected by removal of the cover shell 13 which exposes all of the foregoing parts. Pulleys 36 and 47 together with belt 47 may be replaced with gears or similar coupling means as known to those of ordinary skill in the art.

In this form two axes of rotary motion are defined, emerging from housing 11 at the exterior surface of end wall 50. These rotary axes are geared for common rotation by the pulley belt 47 which is accessible for repair and removal at the other end of housing 11 (opposite end wall 50).

Thus, gearing selection, friction limit, and the consequent rotary power level at the exposed surface of wall 50 are all easily effected by the selection of the pulley sizes, the hoop dimension of belt 47, and its elastic compliance. More importantly, this selection is made through the access opening situated distally from the working end of the structure, minimizing the likelihood of injury and sharp edge exposure.

Figure 4:
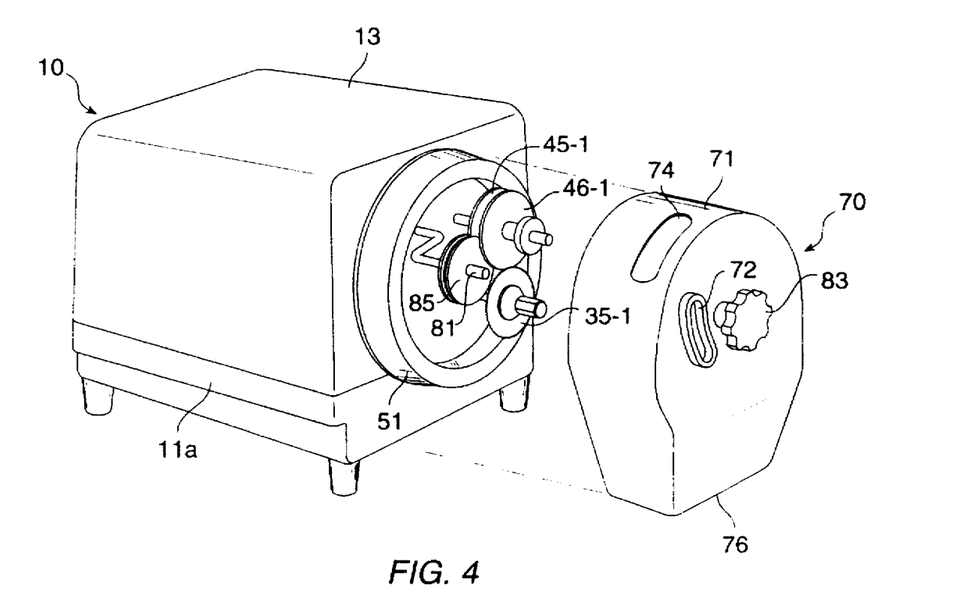
FIG. 4 is a perspective illustration, with the cover separated, of a deveining apparatus in accordance with a presently preferred embodiment of the present invention.
Figure 5:
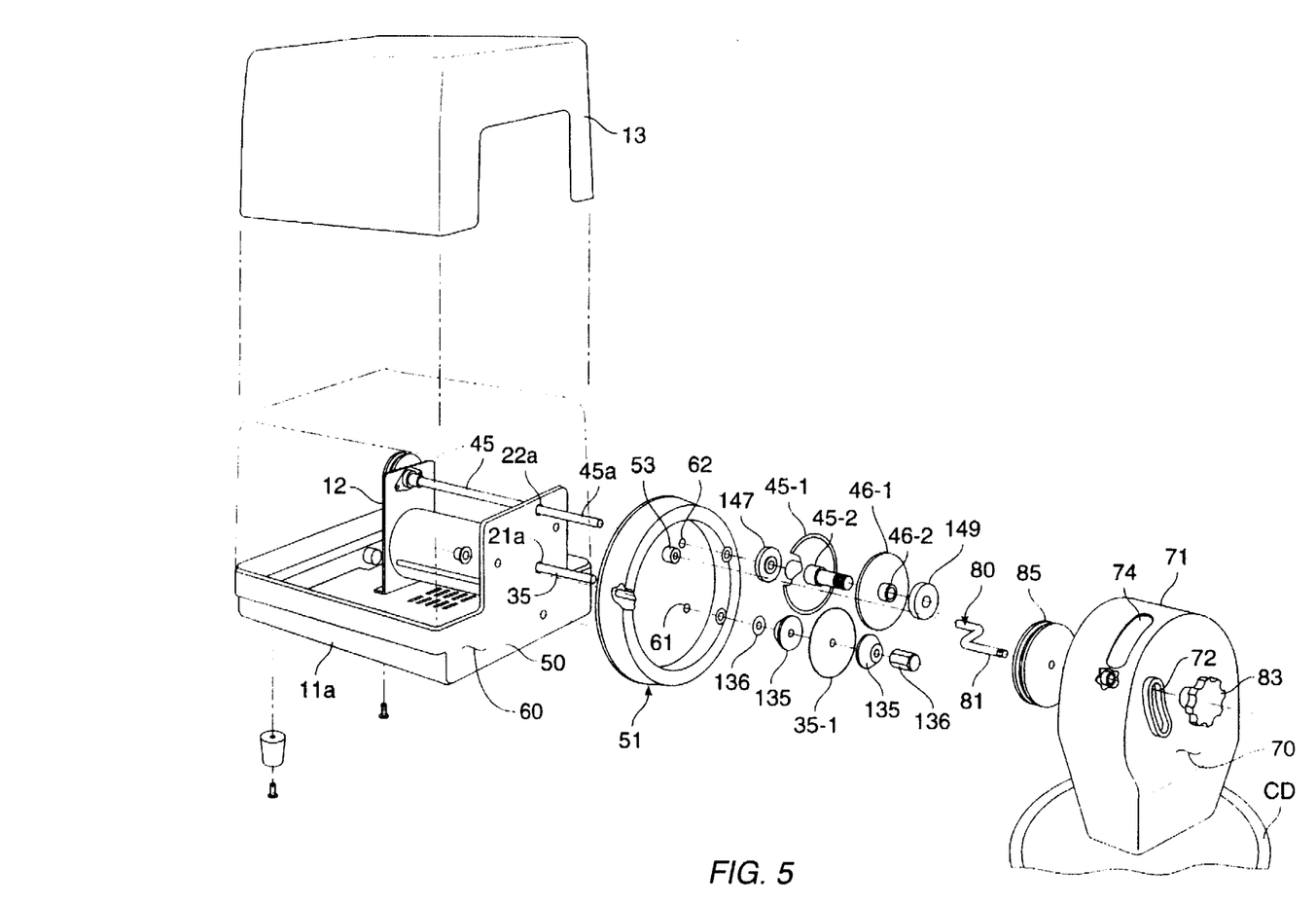
FIG. 5 is an exploded perspective illustration of a deveining apparatus according to FIG. 4 and in accordance with a presently preferred embodiment of the present invention.
Figure 6:
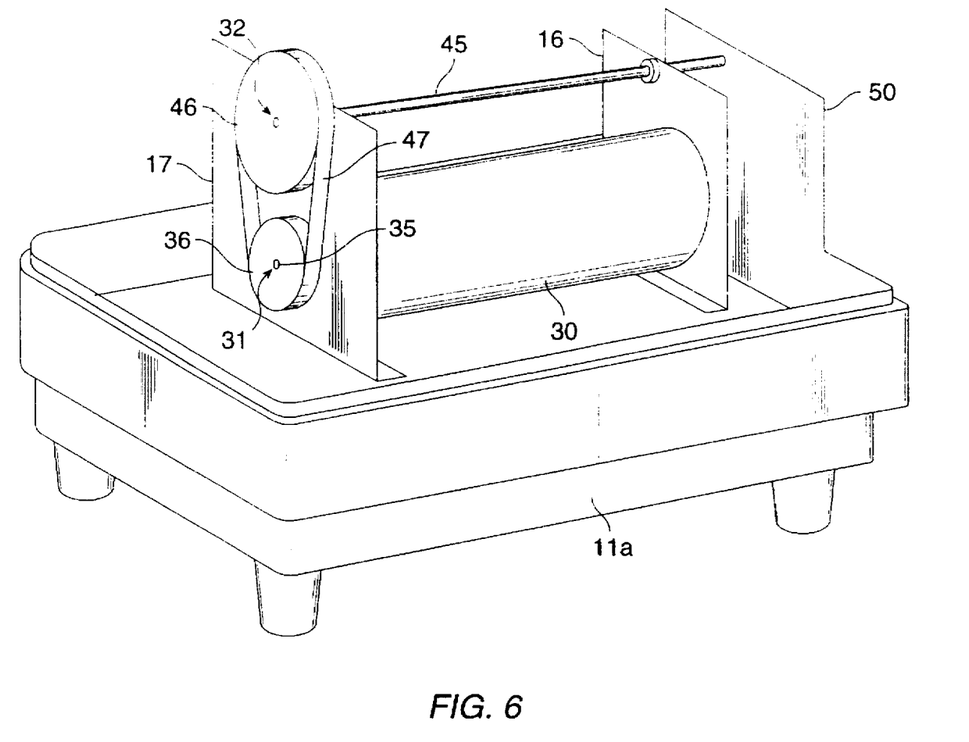
FIG. 6 is a perspective illustration of the exposed rear view of a deveining apparatus according to FIG. 4 and in accordance with a presently preferred embodiment of the present invention, illustrating the operational engagement of the drive power source thereof.

On its exposed surface 60, wall 50 is mated with a circular adapter 51 provided with a bead or projection 52 surrounding the shafts 35 and 45 and conformed to engage by friction fit the peripheral skirt 71 of a thin-walled cover 70. Cover 70 is thus removable from its engagement on the peripheral bead, and provides a shield for the cutting and deveining mechanisms driven by shafts 35 and 45. Included in this mechanism is a bell crank 80 pivoted from a boss 53 formed on adapter 51, adjacent the shaft journals 61, 62. Bell crank 80 extends a threaded rod 81 through an arcuate cutout 72 in the end surface 73 of the cover 70. A knurled clamping nut 83 threadably engages rod 81 on the exterior of cover 70 as shown, thus both fixing cover 70 in its engagement on the peripheral bead and fixing the bell crank 80 rotary selection.

In this form the engagement of the cover 70 is unlike that taught in the prior art, the bell crank 80 effecting a further securing mechanism to prevent inadvertent cover removal. This same bell crank structure also serves as the pivot post for a depth of cut idler roller 85 that selects the cutting depth of the deveining process.

Figure 7:
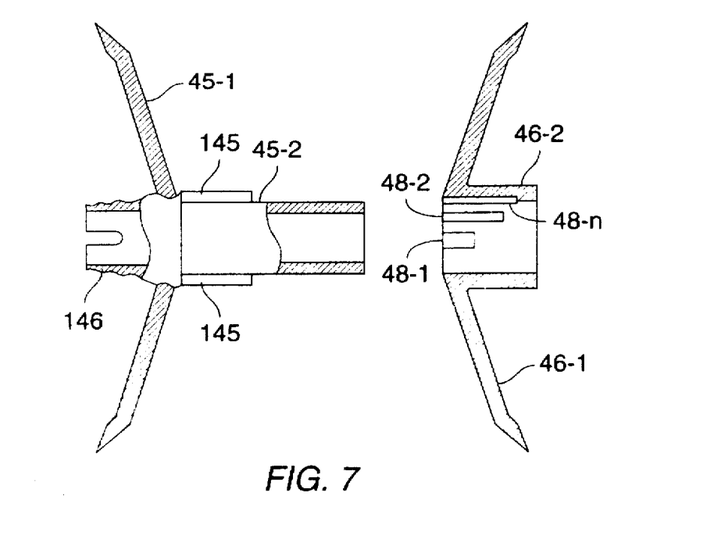
FIG. 7 is a side view detail of the cooperative engagement of a pair of guide disks of a deveining apparatus according to FIG. 4 and in accordance with a presently preferred embodiment of the present invention, illustrating the cooperative interrelationship used to select the separation therebetween.
Figure 8:
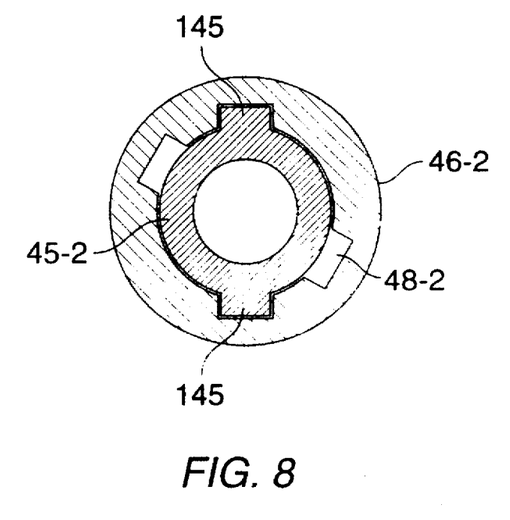
FIG. 8 is a detail view, in section, illustrating the selection options of the relationship shown in FIG. 7.

More precisely, shaft 45 extends to the exterior of wall 50 exposing thereat a mounting segment 45a. A generally frustoconical, male, feeder disk 45-1 provided with a center hub sleeve 45-2 is then mounted on mounting segment 45a, sleeve 45-2 preferably including a plurality of splines 145 over its exterior, the hub sleeve extending to the other side of the disk to form a threaded taper 146 split for inward collapse and engaged to a clamping nut 147. Thus once mounted on mounting segment 45a the compression by nut 147 fixes the male disk 45-1 on shaft 45. An opposing frustoconical feeder disk 46-1, provided with a corresponding center hub sleeve 46-2 grooved on the interior in varying length grooves 48-1 through 48-n is then selectively mounted on the splines 145, to select the separation between the feeder disks. Once so mounted, a nut 149 engages the exterior end of the mounting segment 45a to keep the feeder disks together. A circular cutter blade 35-1 fitted on the exposed end of shaft 35, and clamped thereat by arbors 135 between nuts 136, extends into the gap between disks 45-1 and 46-1 to cut the shrimp shell as a shrimp is fed between the disks.

To permit the passage of the shrimp S into the cover and thereafter between the feeder disks (45-1, 46-1), the cover skirt 71 of cover 70 is provided with an entry opening 74 aligned in vertical alignment over the gap between the feeder disks 45-1, 46-1. An idler roller 85, fixed for rotation on rod 81, then directs the shrimp between the disks and against the rotating cutter 35-1 to effect the cutting and deveining sequence. Once cut and deveined, the shrimp carcass is than advanced towards an exit opening 76 in cover 70, where it is dropped by force of gravity into a collection dish CD or other convenient receptacle.

It is to be noted that a typical shrimp harvest will be characterized by a typical shrimp size. Thus periodic adjustment is required in the separation between the feeder disks, and also in the relative alignment of the idler as various harvest sizes are processed. This adjustment is rendered particularly convenient by the present invention by way of the rod 81 to cover 70 engagement, in a mechanism that omits the added journals for the idler and the consequent further incidence of fluid migration into the motor assembly. This same improvement over the prior art also effects simplification in the cover engagement, effectively disabling the mechanism when the cover is removed, thus rendering periodic cleaning both safe and expedient. In this manner the operator safety is improved, in a structure that reduces the number of journals and the consequent leakage, and that concurrently effects a secured engagement of the cover over the cutting assembly.

It should be noted that food items such as hot dogs, jalapeno peppers and other similar tube-shaped items can be cut by the above-described invention.

Figure 9:
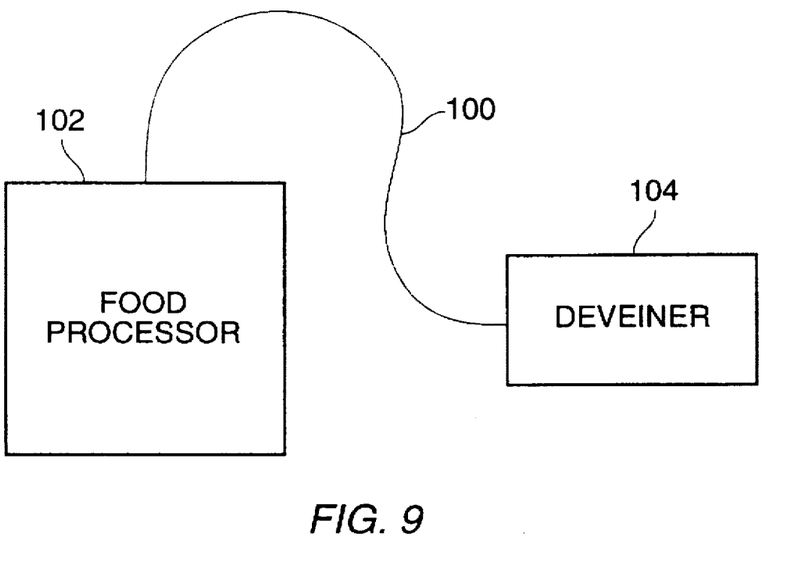
FIG. 9 is a block diagram of an alternative embodiment of the present invention.
Figure 10:
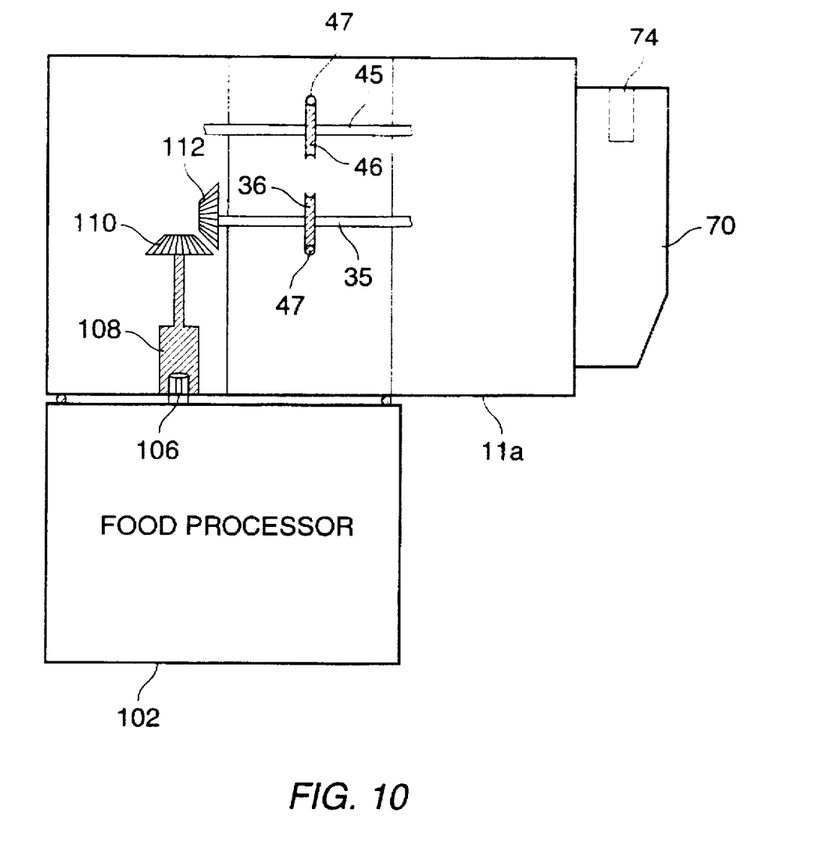
FIG. 10 is a diagram showing a deveiner according to the present invention adapted for use as a food processor attachment.
Figure 11:
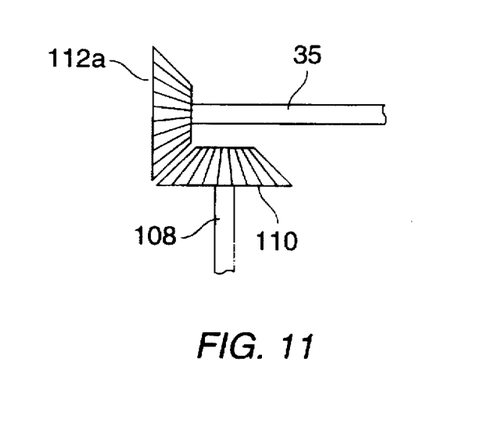
FIG. 11 is a diagram showing an alternative method of coupling rotary drive power from the food processor output shaft to the deveiner to obtain reversed rotational output over the version shown in FIG. 10.

It is also to be noted that electrical motor 30 could be replaced with a shaft (flexible or rigid) (or a belt or chain drive) coupled in a conventional manner to another source of rotary drive power, such as a food processor, blender, or other similar device found in the kitchen. For example, as shown in FIG. 9, a flexible shaft 100 may be coupled from food processor motor base 102 to the deveiner 104 to directly drive either of shafts 35 or 45 or pulleys 36 or 46. Similarly, as shown in FIG. 10, the deveiner may be adapted to be a food processor accessory which fits over and couples to a conventional food processor base in a conventional manner. In FIG. 10 food processor 102 includes a vertical drive shaft 106 adapted to provide rotary drive motion. Coupler 108 contained within deveiner base 11 a is adapted to receive shaft 106. As shaft 106 turns, so does gear 110 and gear 112. If a different direction of rotation is desired, the varient shown in FIG. 11 with gear 112a may be used. Other well known means for redirection of rotational motion may also be used. All of the functions to the right of gear 112 in FIG. 10 are as described above for the varient of the deveiner with an on-board electric motor. Thus the source of rotary power for operating the deveiner may be an output shaft of a motor as described above, or the output shaft of a coupler coupled to a remote motor. Those of ordinary skill in the art will realize that many coupling methods would be useable and equivalent to achieve this additional function, thus rendering the deveiner capable of being a food processor attachment.

While illustrative embodiments and applications of this invention have been shown and described, it would be apparent to those skilled in the art that many more modifications than have been mentioned above are possible without departing from the inventive concepts set forth herein. The invention, therefore, is not to be limited except in the spirit of the appended claims.

What is claimed is:

1. In a powered shrimp deveining apparatus, characterized by a source of rotary power provided with an output shaft, said source being mounted in a housing including an end wall perforated to receive said output shaft, and a rotary cutter mounted on said output shaft external to said housing, the improvement comprising:

a frame structure mounted in the housing and engaged to the source of rotary power, said frame structure including a first bearing means for supporting the output shaft, a second bearing means for supporting a secondary shaft, said second bearing means aligned in parallel with said first bearing means, said secondary shaft extending through the end wall adjacent the output shaft;

pulley means interconnected between the output shaft and said secondary shaft, said pulley means located exterior to said frame structure and distal to said end wall;

a generally circular adapter mounted on the end wall, said adapter mounted exterior to the housing, said adapter including a peripheral bead and a boss within the periphery of said bead aligned adjacent said output and secondary shafts;

a bell crank having a first and second end and pivoted at said first end in said boss, said bell crank including an idler roller on said second end, said second end of said bell crank extending in a threaded projection beyond said roller;

a generally hollow cover provided with a skirt conformed for engaging fit with said peripheral bead, said cover including an arcuate slot conforming in the dimensions thereof with the pivotal motion of said threaded projection; and engaging means selectively engageable to said threaded projection external of said cover upon the engagement of said skirt with said peripheral bead.

2. A powered deveining apparatus according to claim 1, further comprising:

a first and second disk engageable to said secondary shaft, in bracketing alignment of the rotary cutter, said first disk including a splined central hub and said second disk including a tabular central sleeve provided with a plurality of grooves of various length, for selective engagement with said splined hub at engagement separation determined by said grooves.

3. A powered deveining apparatus according to claim 2, wherein:

said idler roller is deployed in generally the same plane as the rotary cutter.

4. A powered deveining apparatus according to claim 3, wherein:

said cover includes an opening in said skirt thereof aligned above said first and second disks, for passing shrimp bodies therebetween.

5. A powered deveining apparatus according to claim 4, wherein:

said housing includes a base portion connected to said frame structure, and a cover shell engageable to said base portion for exposing said pulley means upon the removal of said shell from said base portion.

6. A powered deveining apparatus according to claim 5, wherein:

said pulley means includes a first pulley wheel selectively engageable to the output shaft and a second pulley wheel selectively engageable to said secondary shaft, and a resilient pulley belt engaged to said first and second pulley wheels.

7. A powered deveining apparatus according to claim 6, wherein:

said first and second pulley wheels define a predetermined rotation rate of said secondary shaft in response to the rotation of the output shaft.

8. A powered deveining apparatus according to claim 1, wherein:

said boss formed on said adapter includes a circular recess extending partly into the interior thereof, conformed to receive for pivotal articulation said first end of said bell crank.

9. A powered deveining apparatus according to claim 8, wherein:

said engaging means includes a threaded fastener deployed on the exterior of said cover and threadably engaged to said threaded projection, whereby the threaded compression of said fastener against said cover fixes the pivotal motion of said bell crank and secures said cover on said adapter.

10. A powered deveining apparatus according to claim 9, wherein:

said idler roller is fixed relative to said first and second disks by way of said engaging means.

11. A rotary cutting apparatus comprising:

means for coupling a source of rotary power to an output shaft;

a housing including an end wall perforated to receive said output shaft;

a rotary cutter mounted on said output shaft external to said housing;

a frame structure mounted in said housing, said frame structure including a first bearing means for supporting said output shaft, a second bearing means for supporting a secondary shaft, said second bearing means aligned in parallel with said first bearing means, said secondary shaft extending through said end wall adjacent said output shaft;

coupling means interconnected between said output shaft and said secondary shaft, said coupling means located exterior to said frame structure and distal to said end wall;

a generally circular adapter mounted on said end wall, said adapter mounted exterior to said housing, said adapter including a peripheral bead and a boss within a periphery of said bead aligned adjacent said output and secondary shafts;

a bell crank having a first and second end and pivoted at said first end in said boss, said bell crank including an idler roller on said second end, said second end of said bell crank extending in a threaded projection beyond said roller;

a generally hollow cover provided with a skirt conformed for engaging fit with said peripheral bead, said cover including an arcuate slot conforming in the dimensions thereof with the pivotal motion of said threaded projection; and engaging means selectively engageable to said threaded projection external of said cover upon the engagement of said skirt with said peripheral bead.

12. A rotary cutting apparatus according to claim 11, further comprising:

a first and second disk engageable to said secondary shaft, in bracketing alignment of said rotary cutter, said first disk including a splined central hub and said second disk including a tabular central sleeve provided with a plurality of grooves of various length, for selective engagement with said splined hub at engagement separation determined by said grooves.

13. A rotary cutting apparatus according to claim 12, wherein:

said idler roller is deployed in generally a same plane as said rotary cutter.

14. A rotary cutting apparatus according to claim 13, wherein:

said cover includes an opening in said skirt thereof aligned above said first and second disks, for passing shrimp bodies therebetween.

15. A rotary cutting apparatus according to claim 14, wherein:

said housing includes a base portion connected to said frame structure, and a cover shell engageable to said base portion for exposing said coupling means upon removal of said shell from said base portion.

16. A rotary cutting apparatus according to claim 15, wherein:

said coupling means includes a first pulley wheel selectively engageable to said output shaft and a second pulley wheel selectively engageable to said secondary shaft, and a resilient pulley belt engaged to said first and second pulley wheels.

17. A rotary cutting apparatus according to claim 16, wherein:

said first and second pulley wheels define a predetermined rotation rate of said secondary shaft in response to rotation of said output shaft.

18. A rotary cutting apparatus according to claim 11, wherein:

said boss formed on said adapter includes a circular recess extending partly into an interior thereof, conformed to receive for pivotal articulation said first end of said bell crank.

19. A rotary cutting deveining apparatus according to claim 18, wherein:

said engaging means includes a threaded fastener deployed on an exterior of said cover and threadably engaged to said threaded projection, whereby threaded compression of said fastener against said cover fixes a range of pivotal motion of said bell crank and secures said cover on said adapter.

20. A rotary cutting apparatus according to claim 19, wherein:

said idler roller is fixed relative to said first and second disks by way of said engaging means.

21. A deveiner attachment for a food processor, the food processor including a vertical output shaft for delivering rotary motion, said attachment comprising:

means for coupling the vertical output shaft to an output shaft;

a housing including an end wall perforated to receive said output shaft;

a rotary cutter mounted on said output shaft external to said housing;

a frame structure mounted in said housing, said frame structure including a first bearing means for supporting said output shaft, a second bearing means for supporting a secondary shaft, said second bearing means aligned in parallel with said first bearing means, said secondary shaft extending through said end wall adjacent said output shaft;

coupling means interconnected between said output shaft and said secondary shaft, said coupling means located exterior to said frame structure and distal to said end wall;

a generally circular adapter mounted on said end wall, said adapter mounted exterior to said housing, said adapter including a peripheral bead and a boss within a periphery of said bead aligned adjacent said output and secondary shafts;

a bell crank having a first and second end and pivoted at said first end in said boss, said bell crank including an idler roller on said second end, said second end of said bell crank extending in a threaded projection beyond said roller;

a generally hollow cover provided with a skirt conformed for engaging fit with said peripheral bead, said cover including an arcuate slot conforming in the dimensions thereof with the pivotal motion of said threaded projection; and engaging means selectively engageable to said threaded projection external of said cover upon the engagement of said skirt with said peripheral bead.

22. A deveiner attachment for a food processor according to claim 21, further comprising:

a first and second disk engageable to said secondary shaft, in bracketing alignment of said rotary cutter, said first disk including a splined central hub and said second disk including a tabular central sleeve provided with a plurality of grooves of various length, for selective engagement with said splined hub at engagement separation determined by said grooves.

23. A deveiner attachment for a food processor according to claim 22, wherein:

said idler roller is deployed in generally a same plane as said rotary cutter.

24. A deveiner attachment for a food processor according to claim 23, wherein:

said cover includes an opening in said skirt thereof aligned above said first and second disks, for passing shrimp bodies therebetween.

25. A deveiner attachment for a food processor according to claim 24, wherein:

said housing includes a base portion connected to said frame structure, and a cover shell engageable to said base portion for exposing said coupling means upon removal of said shell from said base portion.

26. A deveiner attachment for a food processor according to claim 25, wherein:

said coupling means includes a first pulley wheel selectively engageable to said output shaft and a second pulley wheel selectively engageable to said secondary shaft, and a resilient pulley belt engaged to said first and second pulley wheels.

27. A deveiner attachment for a food processor according to claim 26, wherein:

said first and second pulley wheels define a predetermined rotation rate of said secondary shaft in response to rotation of said output shaft.

28. A deveiner attachment for a food processor according to claim 21, wherein:

said boss formed on said adapter includes a circular recess extending partly into an interior thereof, conformed to receive for pivotal articulation said first end of said bell crank.

29. A deveiner attachment for a food processor apparatus according to claim 28, wherein:

said engaging means includes a threaded fastener deployed on an exterior of said cover and threadably engaged to said threaded projection, whereby threaded compression of said fastener against said cover fixes a range of pivotal motion of said bell crank and secures said cover on said adapter.

30. A deveiner attachment for a food processor according to claim 29, wherein:

said idler roller is fixed relative to said first and second disks by way of said engaging means.

* * * * *

UNITED STATES PATENT AND TRADEMARK OFFICE
CERTIFICATE OF CORRECTION

PATENT NO. : 5,613,903
DATED : March 25, 1997
INVENTOR(S) : James Harris and Roy Fujitaki It is certified that error appears in the above-indentified patent and that said Letters Patent is hereby corrected as shown below:

Column 4, line 16: replace "11 a" with --11a--.
Column 5, line 66: replace "11 a" with --11a--.

Signed and Sealed this

Nineteenth Day of August, 1997

Attest:

BRUCE LEHMAN

Attesting Officer

Commissioner of Patents and Trademarks